(12) United States Patent
Hussain (10) Patent No.: US 10,136,058 B2
(45) Date of Patent: Nov. 20, 2018

(54) VIRTUAL PRESENCE DEVICE, SYSTEM, AND METHOD

(71) Applicant: Shakil Hussain, Lynnwood, WA (US)

(72) Inventor: Shakil Hussain, Lynnwood, WA (US)

( * ) Notice: Subject to any disclaimer, the term of this patent is extended or adjusted under 35 U.S.C. 154(b) by 0 days.

(21) Appl. No.: 15/662,016

(22) Filed: Jul. 27, 2017

(65) Prior Publication Data

US 2018/0035049 A1   Feb. 1, 2018

Related U.S. Application Data

(60) Provisional application No. 62/367,456, filed on Jul. 27, 2016.

(51) Int. Cl.
| | |
|---|---|
| *H04N 7/15* | (2006.01) |
| *H04N 5/232* | (2006.01) |
| *H04N 7/14* | (2006.01) |
| *H04R 1/40* | (2006.01) |
| *H04R 3/00* | (2006.01) |

(52) U.S. Cl.
CPC ......... *H04N 5/23238* (2013.01); *H04N 7/142* (2013.01); *H04N 7/147* (2013.01); *H04N 7/15* (2013.01); *H04R 1/406* (2013.01); *H04R 3/005* (2013.01); *H04N 5/23216* (2013.01); *H04N 2007/145* (2013.01)

(58) Field of Classification Search
None
See application file for complete search history.

(56) References Cited

U.S. PATENT DOCUMENTS

| | | | |
|---|---|---|---|
| 2015/0271402 A1* | 9/2015 | Guo ................... | H04N 5/23238 348/39 |
| 2016/0286119 A1* | 9/2016 | Rondinelli ............. | G03B 17/12 |
| 2017/0311028 A1* | 10/2017 | Dow ..................... | G06F 13/385 |
| 2018/0011844 A1* | 1/2018 | Park ...................... | G06F 3/0237 |

* cited by examiner

*Primary Examiner* — Creighton Smith
(74) *Attorney, Agent, or Firm* — Benedict R. Dugan; Lowe Graham Jones PLLC (57) ABSTRACT

An example virtual presence system includes at least a first and second mobile device in electronic communication with one another, a panoramic camera coupled to the second mobile device. A user of the first mobile device can specify a position (e.g., location or orientation), such as via a joystick or head-mounted display. The specified position is transmitted to the second mobile device, which selectively obtains image data from the panoramic camera corresponding to the specified position. The selected image data is transmitted as a video stream or other format to the first mobile device, thereby allowing the user of the first mobile device to view surrounding environment available at the second mobile device.

17 Claims, 10 Drawing Sheets

VIRTUAL PRESENCE DEVICE, SYSTEM, AND METHOD

PRIORITY CLAIM

This application claims the benefit of U.S. Provisional Patent Application No. 62/367,456, entitled "VIRTUAL PRESENCE DEVICE, SYSTEM, AND METHOD," filed on Jul. 27, 2016, the content of which is incorporated herein by reference in its entirety.

TECHNICAL FIELD

The present disclosure relates to remote two- or multi-way video participation devices, and more particularly, to a remote virtual presence device allowing remote control of 360-degree viewing of destination surroundings and transfer of data between origin and destination surroundings, for example in substantially real time.

BACKGROUND

There is an increasing demand for expediting communication and information transfer in all aspects of modern life, including business, social, and private settings. Among such demands is the desire and the need to remotely participate in a distant environment without being physically present.

There are several apps and software systems currently available such as Google® Hangouts®, Apple® Facetime®, WhatsApp®, Viber®, and Skype® that allows a person to communicate and view another location in real-time with the use of devices such as smartphones that have wireless capabilities, built-in cameras and voice input and output facilities such as microphones, speakers and headphones.

Present real-time communication systems however do not allow the users the freedom to view in the direction they desire. Their view is instead dependent upon the direction where the other device is being pointed to by the other end user.

DETAILED DESCRIPTION

Embodiments described herein provide enhanced computer- and network-based methods, devices, and systems for remote virtual presence. Some embodiments provide a remote virtual presence device allowing remote control of 360-degree viewing of remote surroundings in substantially real time. The remote virtual presence device may be mobile, such as a smart phone coupled to a 360-degree camera. Alternatively, the remote virtual presence device may be substantially fixed in location, such as a conferencing device located in an office setting or a capture device mounted to a fixed structure (e.g., on a utility pole, on a building, in a sports arena, in a concert venue). The remote virtual presence device may also or instead be mounted to a vehicle, such as a car, boat, mobile robot, aerial piloted or unpiloted vehicle (e.g. drone), or the like.

1. Overview

Through this disclosure various methods, systems, and devices are described to provide a thorough understanding of certain embodiments. It is understood however that other embodiments may include varying combinations of the described and not described methods and system features suitable to enable transmission and reception of live, or substantially live, streaming audio, visual and motion data between devices, allowing end users to communicate verbally with the ability to selectively view remote surroundings by controlling the directional view of a panoramic camera that responds to a three dimensional movement of a headset, joystick, or a suitable pointing device. All such variations are contemplated to be within the scope of the present disclosure. For clarity of description wherever electronic communication is referred to in this disclosure, the phrase includes any form of wireless, wired, electronic, Bluetooth, other protocols, and/or any suitable protocol for information communication between devices.

Figure 1:
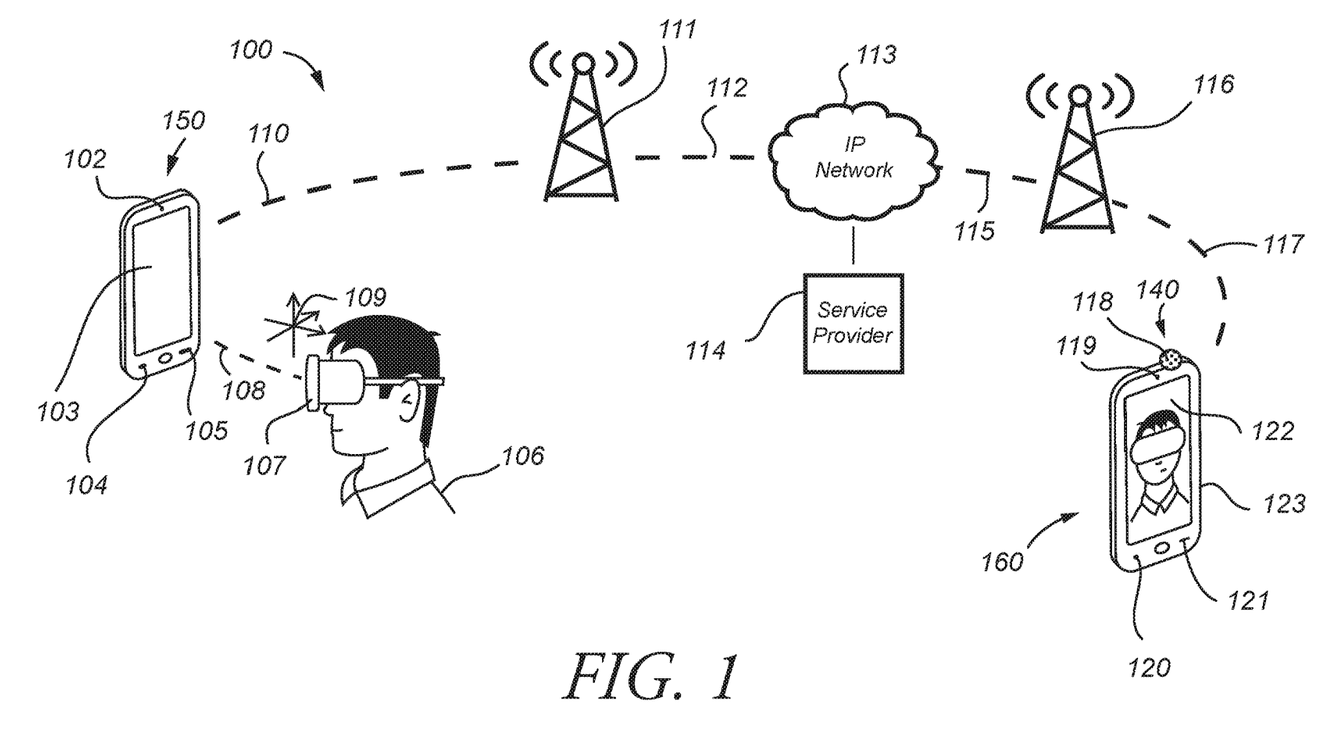
FIG. 1 is a schematic view of a virtual presence system according to one embodiment.

FIG. 1 illustrates a possible configuration of a virtual presence system 100 according to one embodiment. According to one aspect, the system 100 includes a first mobile device 150 and a second mobile device 160 remotely coupled to one another via one or more cellular (e.g., 4G LTE) and/or wireless protocols for communication (e.g., WiFi 802.11, WiMAX 802.16), or other suitable means such as Bluetooth.

The system 100 can include a viewing device 107, which can be worn by a user 106, and which is in wireless communication 108 (e.g., Bluetooth) with the first mobile device 150. In typical embodiments the first mobile device 150 is a smart phone, but it could instead by a tablet computer, a laptop computer, or the like. The viewing device 107 in this example is a headset display, such as virtual reality goggles, eyewear, helmet, or other head-mounted display. The first mobile device 150 can in one aspect include at least one camera 102, a viewing screen 103, a microphone 104, and a speaker 105.

According to one aspect, the second mobile device 160 includes a 360-degree image capture device 140 coupled to a body thereof. In this aspect, the capture device 140 can include a camera and/or any other suitable motion image or image-stitching device or a device incorporating a motion image or image-stitching application. For clarity, and without any intention to limit the scope of the present disclosure the capture device will hereinafter be referred to as camera 140.

The camera 140 can be rotatably coupled to, or with respect to, the body 123 of the second mobile device 160. The system 100 in one embodiment can be configured to facilitate controlling a direction of view from the camera 140 situated on the second smartphone 160 by head movement of the user 106 while wearing the viewing device 107.

In the illustrated embodiment, the viewing device 107 includes a monitor or screen to communicate images to the user 106. The displayed video images are obtained from the first mobile device 150, which receives them from the second mobile device 160, which in turn obtains them from the camera 140.

Embodiments provide a communication protocol that facilitates communication and interaction between the illustrated devices. For example, in one embodiment, the viewing device 107 is configured to transmit movements and position (e.g., head movement) of the user 106 along a three-dimensional axis 109 to the first mobile device 150. The first mobile device 150 includes an application, program, or similar software module that transmits data relating to movement, audio, and/or visual data to the second mobile device 140. Such transmission can occur directly or indirectly between the first mobile device 150 and the second mobile device 160.

Upon receiving information about the head movements and/or position of the user 106, an application, program, or other software module on the second mobile device 160 in turn determines a directional view of the camera 140 for the user 106. For example, if the user 106 tilts his head upwards, this action (or at least the new location) of the user's head is transmitted by the first mobile device 150 to the second mobile device 160. The second mobile device 160, in cooperation with the camera 140, obtains one or more relevant images, such as by preparing and/or obtaining one or more individual images or an encoded video stream (e.g., MPEG stream) from the camera 140. The obtained image data is then transmitted by the second mobile device 160 back to the first mobile device 150.

In one embodiment, the system 100 can include one, or a network of, first cellular towers 111. In one embodiment, the first mobile device 150 can include an interim wireless transmission features to initiate an interim wireless transmission 110 of material such as live, or substantially live, stream audio, visual, and motion and/or position data to the first network of cell towers 111 (collectively, "Client Data").

In one embodiment, the system 100 can include one, or a network of, Internet provider, or equivalent, systems 113. In one embodiment, the first cell towers 111 can communicate the Client Data through wireless transmission 112 to the Internet provider system 113. In one aspect, the system 100 can include a service provider 114, which can manage the Internet provider system 113.

In one aspect, the Internet provider system 113 can transmit the Client Data via wireless or cellular or other electronic communication 115 directly or indirectly to the second mobile device 160. In one aspect, the Internet provider system 113 can transmit the Client Data via wireless or cellular communication or other electronic communication 115 to a second network of cellular towers 116, which in turn is configured to locate and wirelessly or through cellular or other electronic communication 117 transmit the Client Data to the second mobile device 160.

In one aspect, the camera 140 of the second mobile device 160 includes a plurality of viewing features, lenses, and/or capturing mediums 118 (e.g., CMOS or CCD sensors/chips). For clarity and without any intention to limit the scope of the present disclosure, such viewing feature is hereinafter referred to as lens(es) 118. In one aspect, the second mobile device 160 can include another image capture device or standard camera or recording device 119, a microphone 120, a speaker 121 and a viewing screen or monitor 122.

In one embodiment, the camera 140 can transmit and/or electronically communicate images and/or motion images or pictures from surroundings thereof, as well as audio data (collectively, "Host Data") to the first mobile device 150 and/or the viewing device 107 in a reverse fashion as that described with respect to Client Data electronic communication or transmission from the first mobile device 150.

Therefore, according to one embodiment, Client Data can be, through wireless and/or cellular, or electronic communication, or other remote data transfer protocols, for example Bluetooth communication for shorter ranges, transferred to the second mobile device 160, thereby manipulating the camera 140. For example, motion of the user 106 head and/or body, imparting motion to the viewing device 107 can in one aspect manipulate and/or direct proportionally and directionally, the camera 140. In such an example, the camera 140 then transmits to the screen or monitor of the viewing device images and/or motion images or pictures of the corresponding surroundings thereof along the axes coordinates associated with the user 106 motion. Some embodiments incorporate retina movement detection techniques, in order to communicate motion stemming from movement of the retina or eyeball of the user 106.

The described techniques provide important advances over the prior art. In particular, by automatically accounting for and transmitting information about changes in position and movement at the client end (e.g., viewing device 107 and/or mobile device 150), there is no need for the user 106 to instruct the remote device 160 to change the camera angle or focus on a different subject. If the user 106 wants to look to the right, he need only turn his head to the right. The new position information will be transmitted to the remote device 160, which will obtain the corresponding image data from the camera 140.

Note also that the remote device 160 tracks and compensates for at least some changes in position and orientation of the remote device 160 and/or the camera 140 itself. It does so in order to provide the user 106 with the appearance of a fixed frame of reference. The software module executing on the remote device 160 subtracts out any movement of the remote device 160. For example, if the mobile device 160 is turned 90 degrees to the right, but the user 106 has not moved, then the user 106 is provided with the same field of view as before the movement of the device 160, which would require obtaining image data from a different portion of the camera 140 field of view, specifically 90 degrees left of the previous view in order to compensate for the rightward turn of the device 160.

Note that changes in the movement (a change of position as opposed to orientation) of the remote device 160 may not be compensated for by the device 160. Some changes in position may result in only minor changes the view of the camera 140. For example, if the subject is a far off landscape, moving the device 160 a meter or two in any direction will not significantly change the view of the camera 140. But for closer-in subjects, even minor positional changes can result in significant changes to the camera 140 view. In such cases, the device 160 may, based at least in part on whether the view has changed by more than a threshold amount, determine the relevant positional changes and transmit those to the device 150, such that some indication of movement can be given to the user 106. For example, an icon, sound, or other message indicating movement may be presented on the viewing device 107, so as to reduce disorientation by the user 106.

In some embodiments, the remote device 160 may also incorporate (or be connected to) multiple directional microphones, arranged to provide a 360-degree soundscape. Based on the orientation of the viewing device 107, different audio (e.g., different microphones or mixtures thereof) may be selected for transmission to the device 150. As the user 106 reorients his head, he will perceive changes in the audio consistent with rotation or other corresponding changes in position at the remote location.

In some embodiments, a system management service (not shown) may be accessible via the network 113. The service tracks devices that are part of the system 100, in order to provide search and discovery services, in addition to ancillary services, such as user account management, payment processing, and the like. Using this service, the user 106 may find devices (e.g., device 160) based on location, venue, activity, or the like, and then begin to interact with those devices in order to obtain video and/or audio data.

The present disclosure sets forth examples of a system of devices and systems facilitating two or more users to communicate, and other embodiments and/or system can be combined or assembled from various features of the described embodiments. For example, a plurality of users or mobile devices can be replaced with a tablet or laptop or televisions or multi-screen communication devices. In addition, various 360-degrees cameras can be used, for example they can either be integrally built into a mobile device or they can be mounted onto the mobile device as a separate device. In addition the at least two communication devices can transmit Client and Host Data back and forth by other means of communication network.

Figure 2:
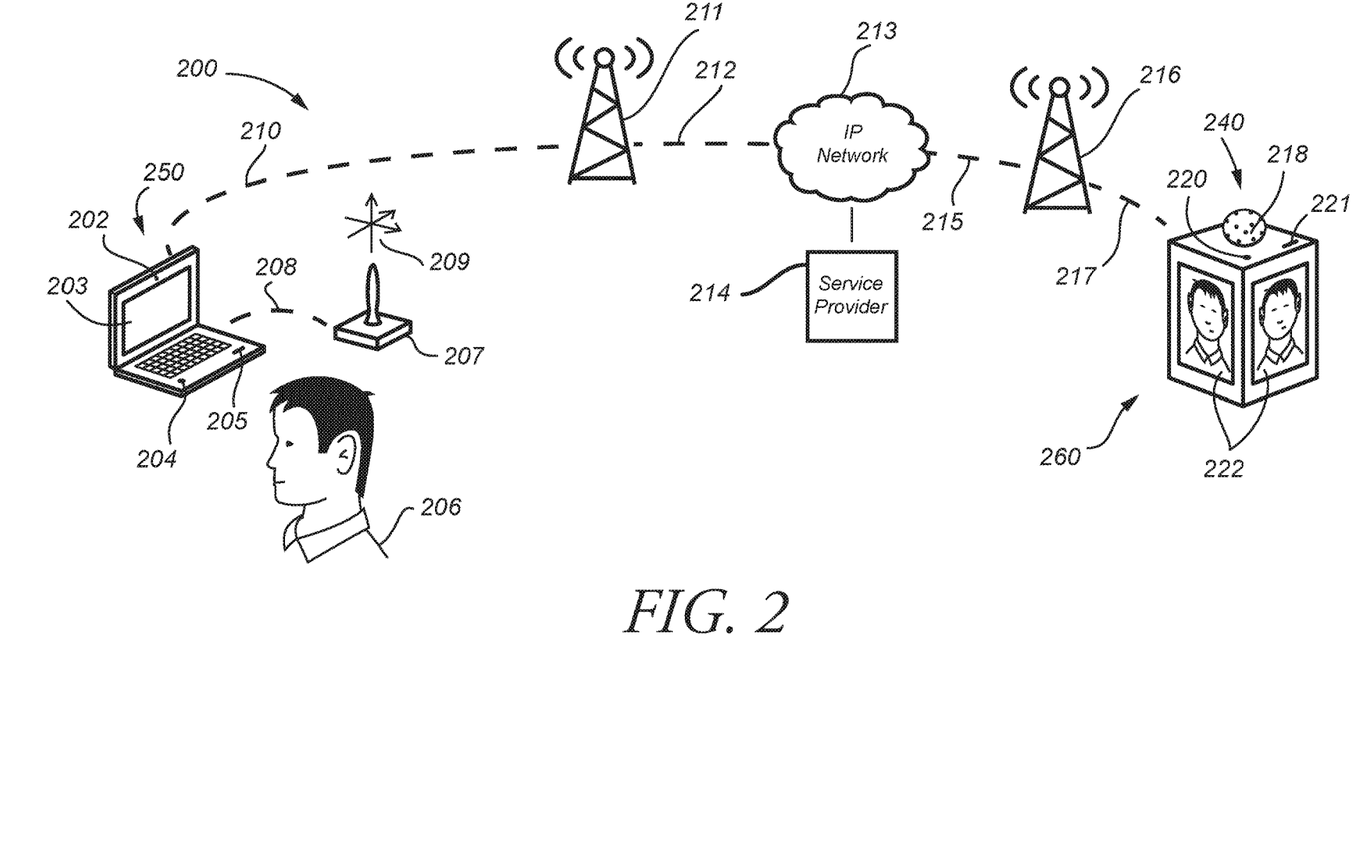
FIG. 2 is a schematic view of a virtual presence system according to another embodiment.

FIG. 2 illustrates a virtual presence system 200 illustrating a laptop 250 and a display and capture device 260 having a plurality of viewing screens and/or monitors that can communicate via wireless and/or cellular or other electronic communication.

In one aspect, a user 206 is able to control a direction of view from the 360-degree camera 240 coupled on the display and capture device 260 via operating a joystick 207. The joystick 207 can be configured, adapted, and/or operable to transmit via electronic communication 208, the user's joystick input along a three-dimensional axis 209 to the laptop 250 having an application or software which transmits the joystick 207 movement data in addition to audio and visual data (collectively, "Client Data") to the display and capture device 260 thereby controlling the directional view of the camera 240 for the user 206 to transmit images from the camera 240 to the laptop 250 in similar fashion to that described in relation to the previous embodiments related to FIG. 1.

In one embodiment, the laptop 250 includes at least a camera 202, viewing screen or monitor 203, a microphone 204, and a speaker 205 configured to transmit through wireless, cellular, and/or Bluetooth or other electronic communication 210 the Client Data to a network of cell towers 211 which in turn forwards wirelessly 212 to an Internet provider, or equivalent, network 213. In one aspect, a service provider 214 manages the network 213 (e.g., and Internet Protocol network).

The network 213 then in one embodiment can be configured to transmit the Client Data via electronic communication 215 to another network of cell towers 216 that locates and transmits through electronic communication 217 the data to the image and capture device 260. In one aspect, the camera 240 can include a plurality of viewing features, lenses, and/or capturing mediums 218. For clarity, and without any intention to limit the scope of the present disclosure such viewing feature is hereinafter referred to as lens(es) 218. In one aspect, the image and capture device can include a microphone 220, a speaker 221, and at least one viewing screen 222. In this FIG. 2, the communicating device 260 has four viewing screens, two of which are not shown in this view and are present on the rear side of the device 260. However, in other embodiments it can include a greater or lesser number of screens or be comprised of a shape other than a cubical shape.

Figure 3:
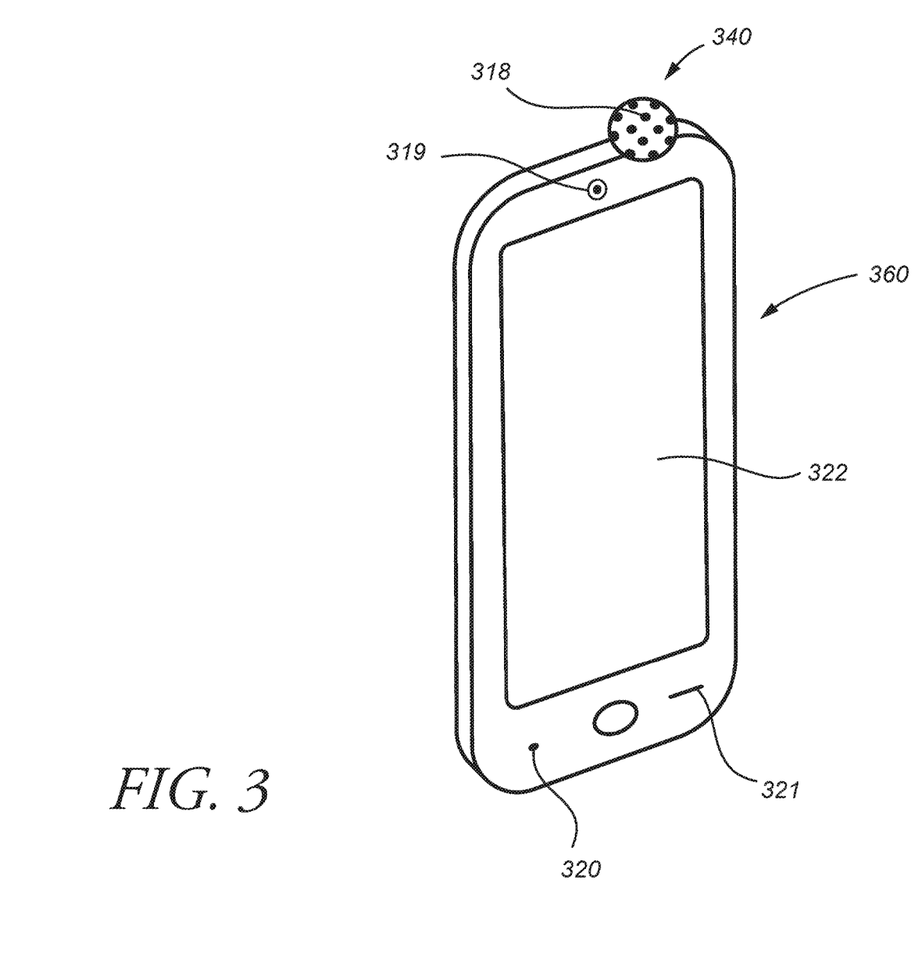
FIG. 3 is an isometric view of a mobile device including a 360 degree image capture device according to one embodiment.

FIG. 3 illustrates an isometric view of a mobile device 360 including at least one integrated 360-degree camera system 340 coupled thereto and having a plurality of lenses 318, a standard camera 319, a microphone 320, a speaker 321 and a viewing screen 322. In one aspect, the camera system 340 can capture images from more than one-dimensional coordinates simultaneously and be rotatably coupled to, or with respect to, a body of the mobile device 360. In one aspect, the mobile device 360 and camera system 340 can operate and/or be part of a virtual presence system as described with respect to the second mobile device 160 in the embodiment of FIG. 1.

Figures 4A, 4B:
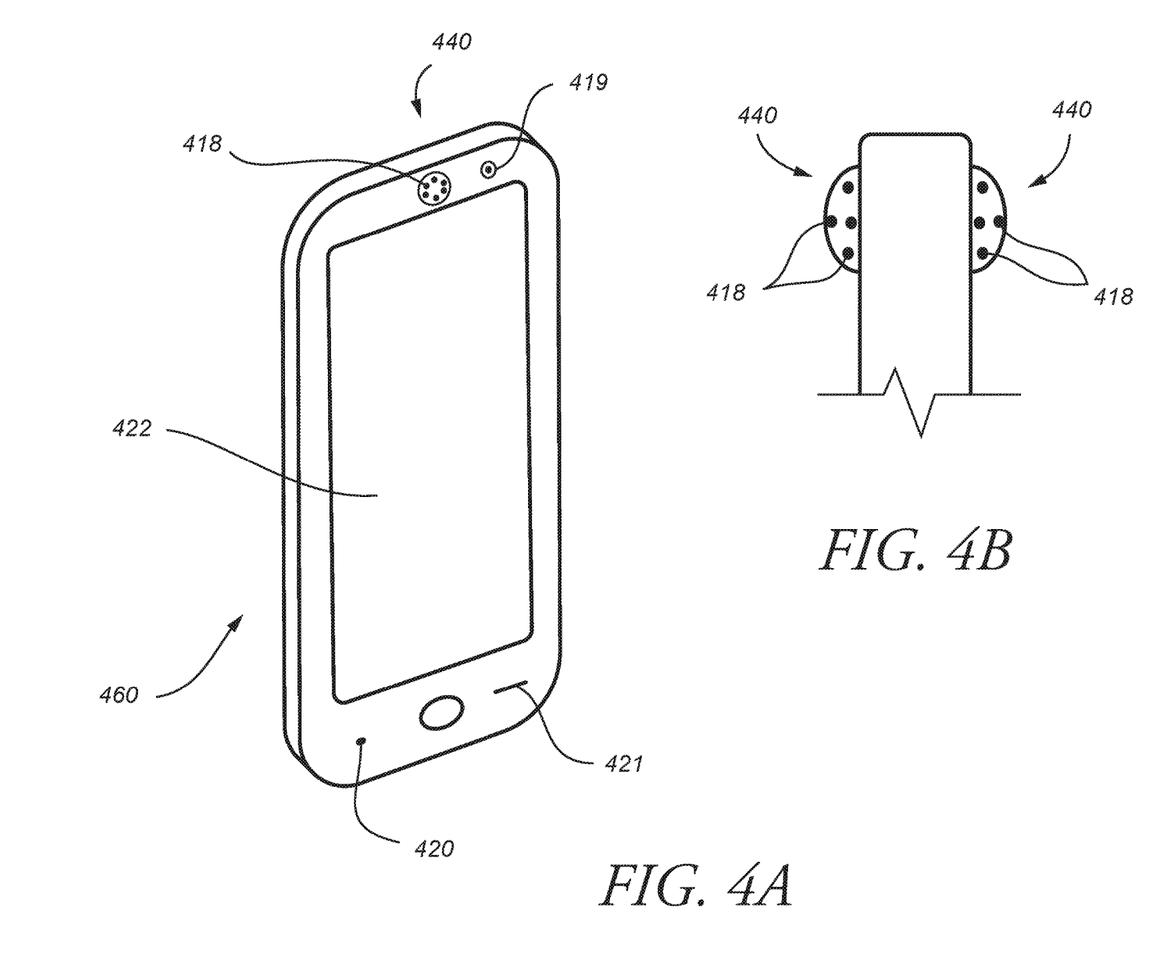
FIG. 4A is an isometric view of a mobile device including a 360-degree image capture device according to another embodiment.
FIG. 4B is a partial side view of the mobile device of FIG. 4A according to one embodiment.

FIG. 4A illustrates an isometric view of a mobile device or tablet 460, and FIG. 4B a partial side view thereof, according to one embodiment that includes at least an integrated and/or coupled thereto panoramic or 360-degree camera system 440 having a plurality of lenses 418, a standard camera 419, a microphone 420, a speaker 421, and a viewing screen 422. In one aspect, the camera system 440 is embedded within a portion of a body of the mobile device 460, for example toward a periphery thereof, such as an upper periphery portion.

Figure 5:
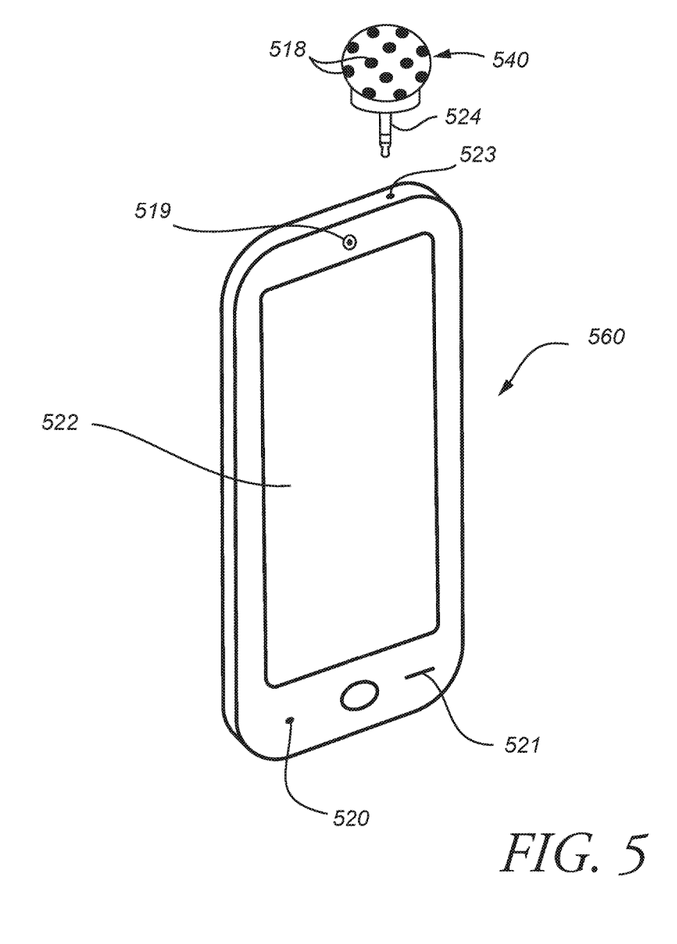
FIG. 5 is an isometric view of a mobile device including a 360-degree image capture device according to yet another embodiment.

FIG. 5 illustrates an isometric view of a mobile device or tablet 560 according to one embodiment and a 360-degree and/or panoramic camera system 540 having a plurality of lenses 518 and coupling device 524, such as a jack, attached thereto. The mobile device 560 in one embodiment includes at least one standard camera 519, a microphone 520, a speaker 521 and a viewing screen 522. According to this embodiment, the camera system 540 can be removably coupled to the mobile device 560 via the coupling device or jack 524 and the input/output coupling slot 523 incorporated in the mobile device 560. The coupling device or jack 524 can include a ⅛" video jack in some embodiments. The camera system 540 can in one aspect be configured to be removed from the mobile device 560 and coupled to another device, tablet, mobile device, and/or other image capture and display device.

Figure 6:
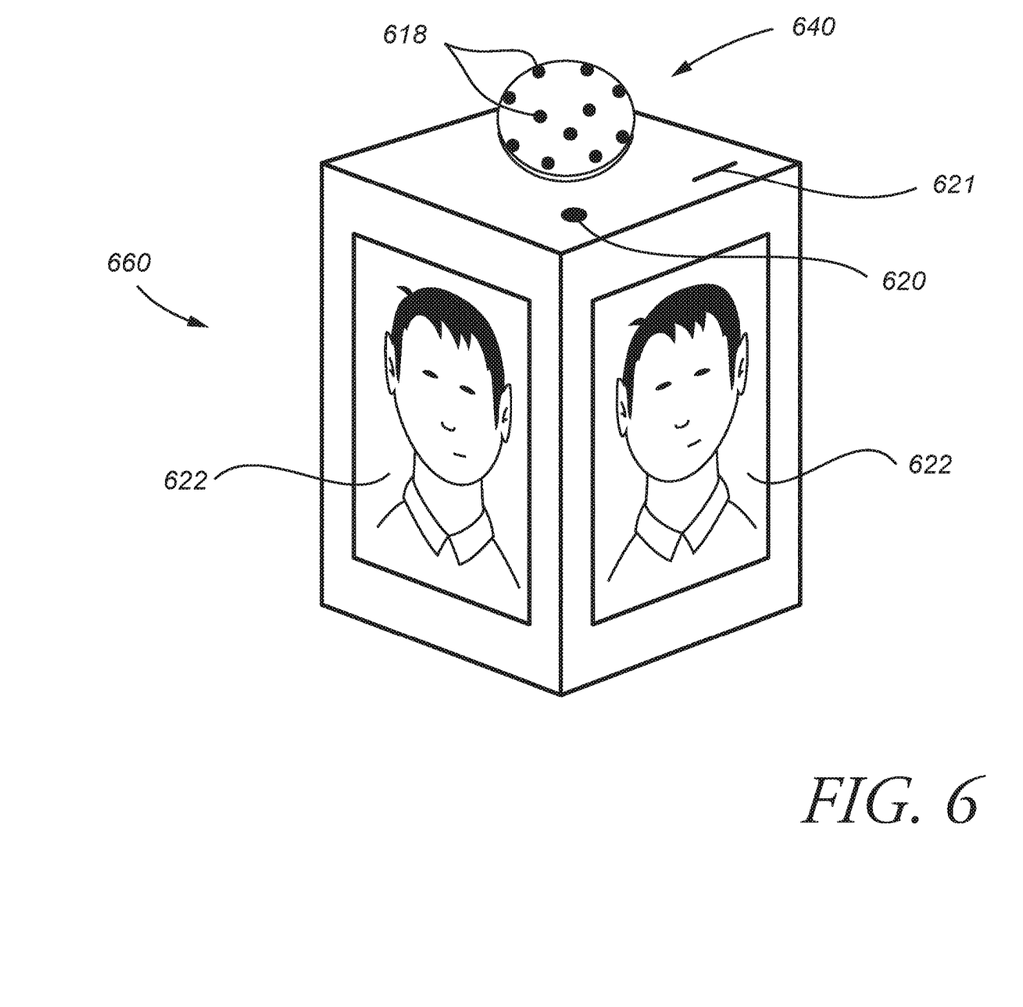
FIG. 6 is an isometric view of a multidimensional capture and display device according to one embodiment.

FIG. 6 illustrates a display and capture device 660 having at least one 360-degree and/or panoramic camera system 640 having a plurality of lenses 618, a microphone 620, a speaker 621, and a at least two, or a plurality of, viewing screens, monitors, and/or displays 622. The monitors 622 can in one embodiment display live stream video conferencing in a situation where there are several persons on one end of the communication such as a business meeting situation. The display and capture device 660 in one example application allows persons in a meeting to view the in-caller who wishes to attend the meeting in virtual live streaming. The camera system 640 can in one aspect be integrated to a body of the display and capture device 660, or removable in another aspect, and it allows the in-caller to freely view around the meeting room through the use of a viewing apparatus 107 in FIG. 1 or by means of a joystick 207 and a laptop 250 in FIG. 2, as is described with respect to the embodiments of these figures, or not described embodiments equivalent thereto.

In some embodiments, the device 660 includes an acoustic source localization module. In such embodiments, an array of two or more microphones is used to determine the origin of a sound (e.g., a speaker's voice) via triangulation or time difference of arrival. In a video conferencing setting, the device 660 may be placed at the middle of the table, surrounded by multiple conferees. The acoustic source localization module can be used to determine the location of the speaker, which can be used to determine a portion of the field of view of the camera 640 from which to transmit image or video data back to the laptop 250, device 150, or other remote system/device. Image data from the determined portion of the camera field of view may be transmitted concurrently with image data from the camera field of view that reflects the selected view of the remote user.

Figure 7:
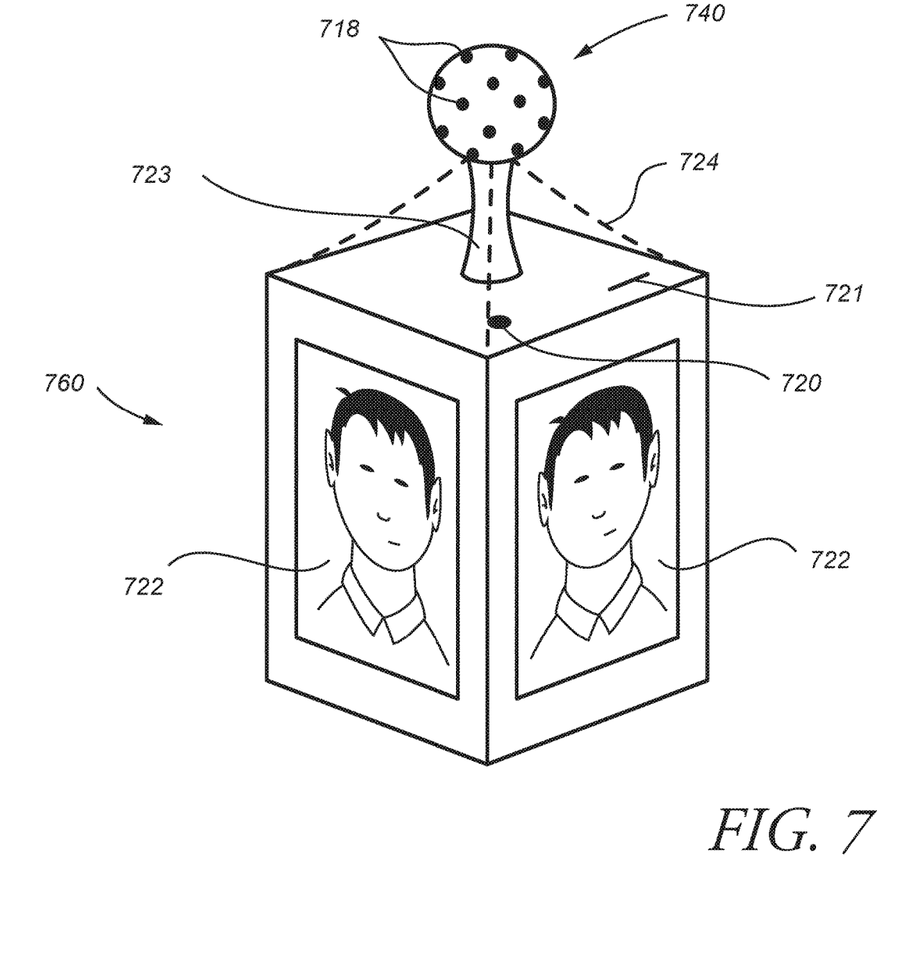
FIG. 7 is an isometric view of a multidimensional capture and display device according to one embodiment.

FIG. 7 illustrates a display and capture device 760 having at least one 360-degree and/or panoramic camera system 740 having a plurality of lenses 718, a microphone 720, a speaker 721, and a at least two, or a plurality of, viewing screens, monitors, and/or displays 722. The monitors 722 can in one embodiment display live stream video conferencing in a situation where there are several persons on one end of the communication such as a business meeting situation. The display and capture device 760 in one example application allows persons in a meeting to view the in-caller who wishes to attend the meeting in virtual live streaming. The camera system 740 can in one aspect be integrated to a body of the display and capture device 760, or removable in another aspect, and it allows the in-caller to freely view around the meeting room through the use of a viewing apparatus 107 in FIG. 1 or by means of a joystick 207 and a laptop 250 in FIG. 2, as is described with respect to the embodiments of these figures, or not described embodiments equivalent thereto.

In the illustrated embodiment of FIG. 7, the camera system 740 is coupled to the body of the display and capture device 760 via a stand 723 configured to space the camera system 740 from the body of the display and capture device 760 and better capture a 360 degree view about the display and capture device 760, including an area below the horizontal plane. In one embodiment, the display and capture device 760 can include a shroud or cover 724 for ornamental or functional purposes.

In one embodiment, the camera system 740 is configured to be in wireless, wire, Bluetooth, or other electronic communication with the monitors 722.

It is understood that various embodiments may include various features or combination of the various equipment, without departing from the scope of the present disclosure. For example, FIG. 1 both mobile devices 150 and 160 can include either an integrated camera system 140 or a removable camera system 540 in FIG. 5 can be mounted onto the mobile devices 150 and 160. In addition or instead, a tablet, smartphone, and/or any other known or to be introduced mobile device, can be used as the mobile device. Furthermore both end users can utilize a viewing apparatus 107 in addition to the communication system 100 show in FIG. 1. Another example in FIG. 2, the communication system 200 can include either the use of laptops 250 and joysticks 207 at both ends.

Alternatively, the communication system 200 can include multi-screen communication device system 260 at both ends to allow groups or people to communicate coupled with the use of a suitable pointing device such as a joystick 207.

Some embodiments provide a virtual venue attendance function. Public venues, such as arenas, stadiums, concert halls, and the like can be modified to incorporate multiple host devices which function as virtual "seats." Remote users can then use the techniques described herein to experience events held at a venue. By using a joystick or viewing goggles, the user can obtain different views of the event.

Therefore, at least certain embodiments of the present disclosure, whether described or not described, allow the end users to communicate and view freely in any direction they desire without having to rely on the other person to direct the camera in any specific direction.

2. Example Processes

Figure 8A:
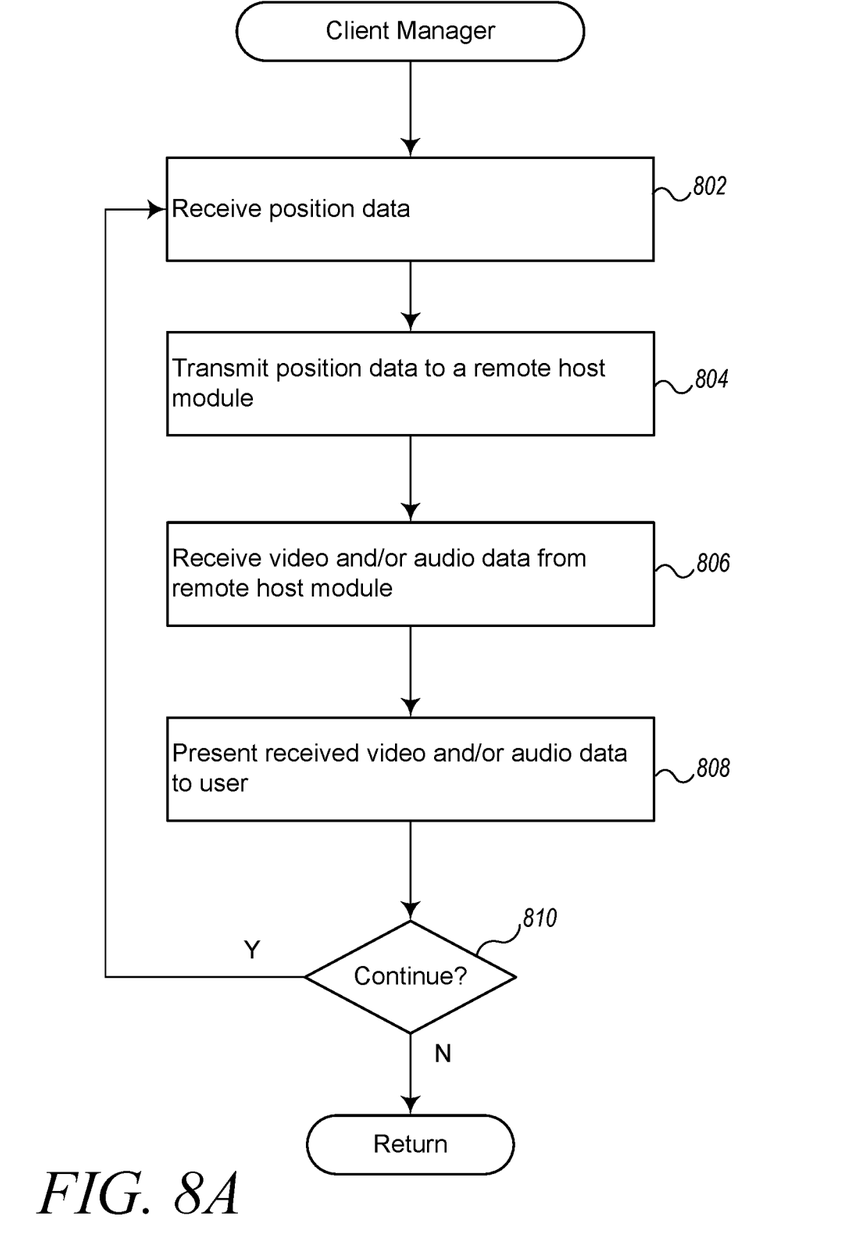
FIGS. 8A-8B are example flow diagrams of virtual presence processes performed by example embodiments.
Figure 8B:
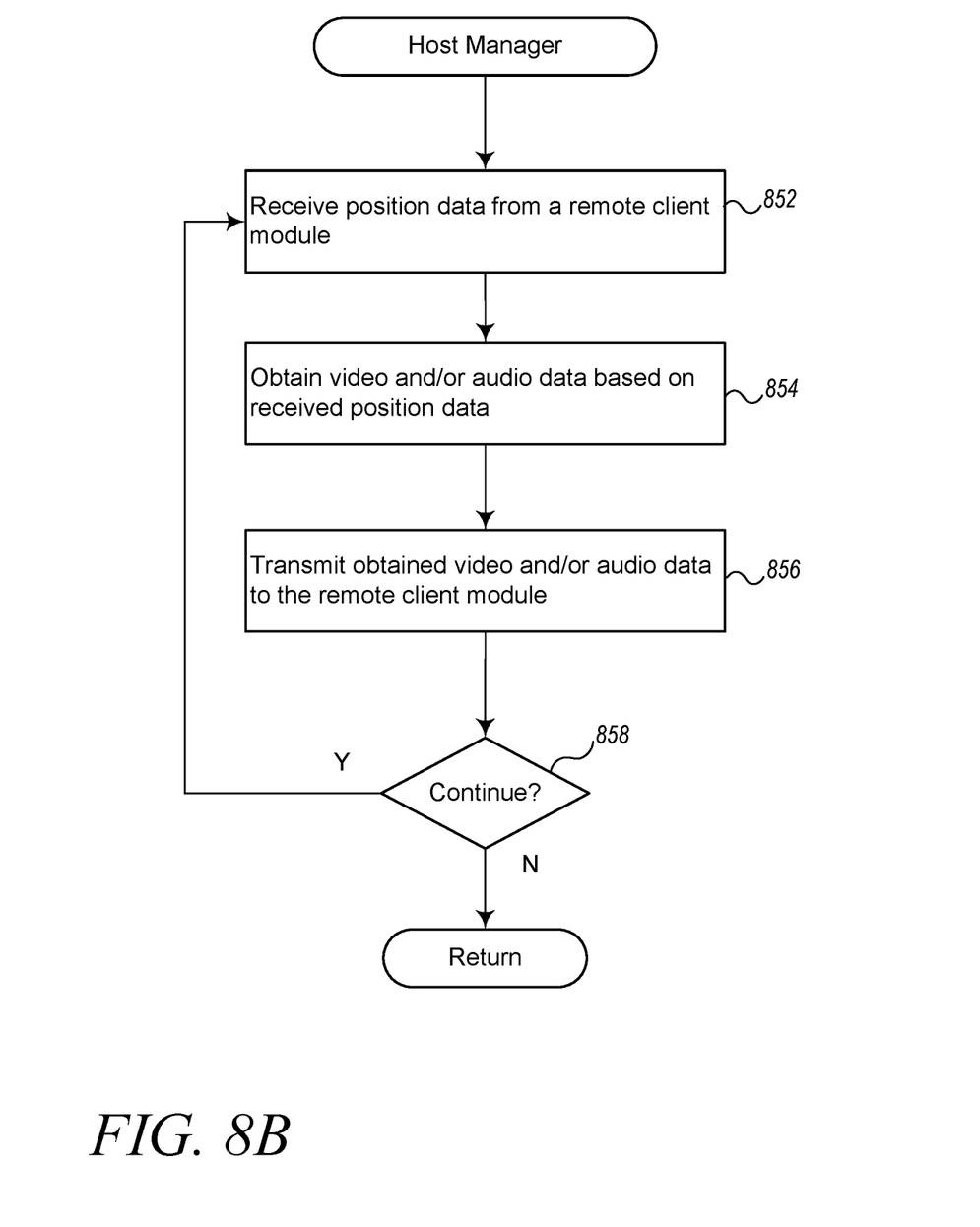

FIGS. 8A-8B are example flow diagrams of virtual presence processes performed by example embodiments. By way of overview, FIG. 8A illustrates a client process performed by a module executing on a client device, such as device 150. FIG. 8B illustrates a host process performed by a module executing on a remote host device, such as device 160.

FIG. 8A illustrates a client process that begins at block 802, where it receives position data. The position data may be received from an input device, such as a joystick or head-mounted display (e.g., goggles). The position data may describe location (in two or three dimensions), orientation, and/or movement (e.g., velocity, acceleration).

At block 804, the process transmits the position data to a remote host module, such as may be executing on device 160. The process may also transmit video and/or audio obtained by the module, such as from a camera on device 150.

At block 806, the process receives video and/or audio data from the remote host module. As described herein, the video/audio data may be selected by the remote host module/device based on the position data provided by this process. The process may receive other or additional data from the remote host module, such as position (e.g., movement) data about the remote device, or the like.

At block 808, the process presents the received video and/or audio data to a user. For example, the process may transmit the received data to viewing goggles, display data on an incorporated display device, or the like.

At block 810, the process continues to block 802 unless it has determined to stop, such as because a user as instructed it to do so.

FIG. 8B illustrates a host process that begins at block 852, where it receives position data from a remote client module. The remote client module may execute a process such as that described with respect to FIG. 8A, above. As discussed there, the position data may be received from an input device, such as a joystick or head-mounted display (e.g., eyewear, goggles, in-helmet display) in communication with the client device.

At block 854, the process obtains video and/or audio data based on the received position data. Obtaining video/audio may include selecting the appropriate video data from a field of view provided by a panoramic camera, such as camera 140 in FIG. 1. The particular video data selected may be determined based on the receive position data, such that the video reflects changes in the position of the remote user. The video data may further be selected based on position data that describes the location, orientation, or movement of the host device and/or camera. In particular, some embodiments may compensate for movement of the host device, in order to provide a consistent frame of reference for the user of the client device, such as by adjusting the selected camera view to compensate for any movement of the camera.

At block 856, the process transmits obtained video and/or audio data to the remote client module. Other data may be transmitted, such as position (e.g., movement) data that reflects the motion of the host device that is executing this process.

At block 858, the process continues to block 852 unless it has determined to stop, such as because a user as instructed it to do so.

Although the blocks in the above flow diagrams are shown as executing in a particular sequence, other embodiments may perform the blocks in other orders or at least in part concurrently.

3. Example Computing System Implementation

Figure 9:
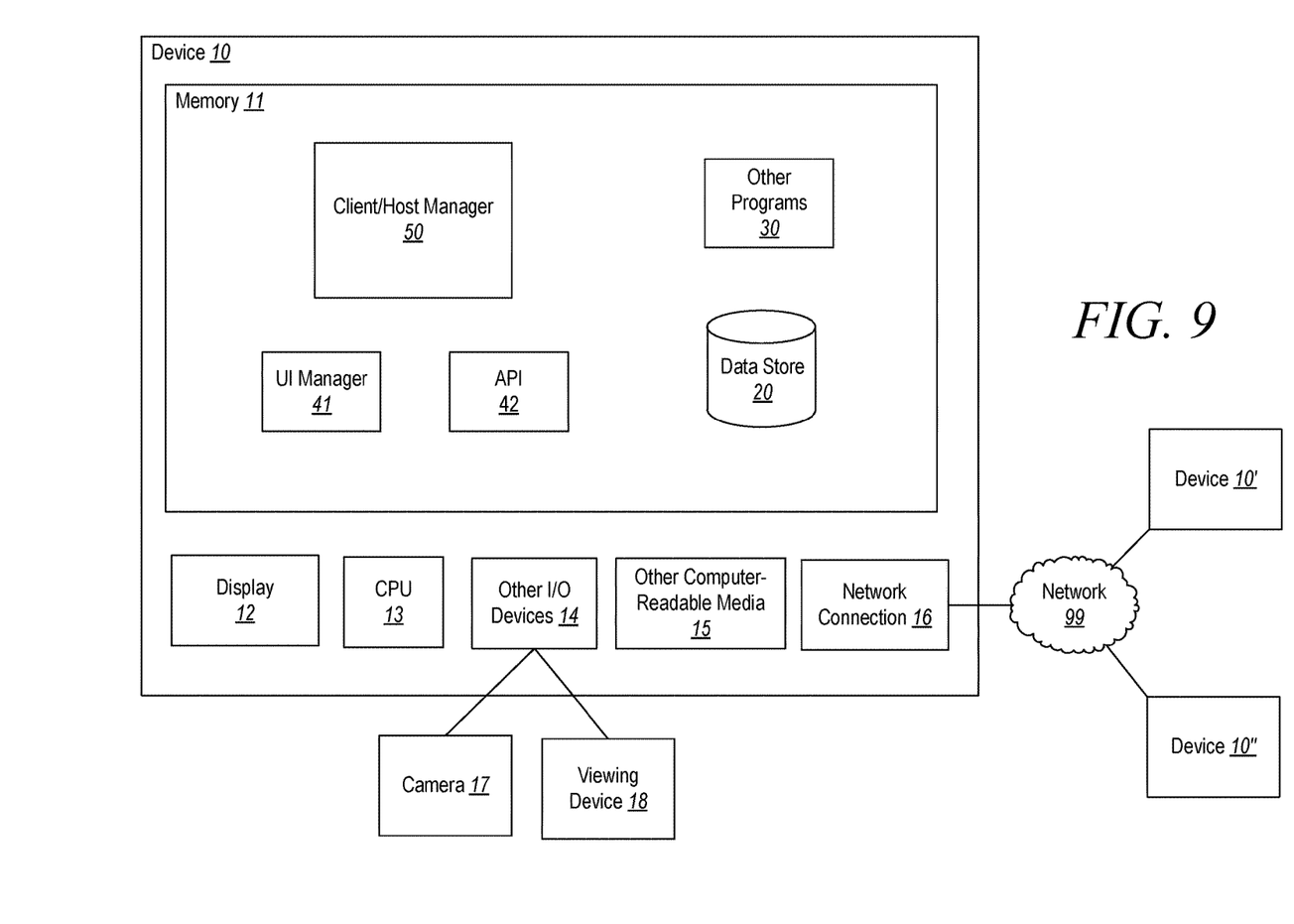
FIG. 9 is a block diagram of an example computing system for implementing elements of a virtual presence system according to an example embodiment.

FIG. 9 is a block diagram of an example computing system for implementing functions of a virtual presence system 100 according to an example embodiment. In particular, FIG. 9 shows a computing system or device 10 that may be utilized to implement a client/host manager 50. The manager 50 may be part of a client device, such as mobile device 150 or a "host" device, such as remote mobile device 160 in FIG. 1. The manager 50 performs one or more of the process described above.

Note that one or more general purpose or special purpose computing systems/devices may be used to implement the described techniques. However, just because it is possible to implement the manager on a general purpose computing system does not mean that the techniques themselves or the operations required to implement the techniques are conventional or well known. In addition, the computing system 10 may comprise one or more distinct computing systems/devices and may span distributed locations. Furthermore, each block shown may represent one or more such blocks as appropriate to a specific embodiment or may be combined with other blocks. Also, the manager 50 may be implemented in software, hardware, firmware, or in some combination to achieve the capabilities described herein.

In the embodiment shown, computing system 10 comprises a computer memory ("memory") 11, a display 12, one or more Central Processing Units ("CPU") 13, Input/Output devices 14 (e.g., keyboard, mouse, CRT or LCD display, and the like), other computer-readable media 15, and a network connection 16. The I/O devices 14 may include or provide an interface to a camera 17 (e.g., camera 140), a viewing device 18 (e.g., goggles 107), and/or other input/output devices illustrated and described above.

The manager 50 is shown residing in memory 11. In other embodiments, some portion of the contents, some or all of the components of the manager 50 may be stored on and/or transmitted over the other computer-readable media 15. The manager 50 preferably executes on one or more CPUs 13 and performs the techniques described herein. Other code or programs 30 (e.g., operating system, application programs, etc.) and potentially other data repositories, such as data repository 20, also reside in the memory 11, and preferably execute on one or more CPUs 13. Of note, one or more of the components in FIG. 9 may not be present in any specific implementation. For example, some embodiments may not provide other computer readable media 15 or a display 12.

The manager 50 interacts via the network 99 with other devices 10' and 10". For example, in the context of FIG. 1, if device 10 is the client device 150, then devices 10' and 10" may be two instance of the remote device 160. The network 99 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The other devices 10' and 10" are constituted similarly to device 10. The devices 10' and 10" may be personal computing devices, such as desktop computers, laptop computers, smart phones, tablets, or the like.

Also included in the memory 11 are a user interface manager 41 and an application program interface ("API") 42. The UI manager 41 provides a view and a controller that facilitate user interaction with the manager 50 and its various components. For example, the UI manager 41 may provide interactive access to the manager 50, such that users can interact with the manager 50, such as by searching for and/or selecting a remote device with which to interact, changing display settings, or the like. In some embodiments, a central server (not shown) tracks devices that are part of the system 100, in order to provide search and discovery services, in addition to ancillary services, such as user account management, payment processing, and the like. Such a server may be connected to the network 99 and accessible via the UI manager 40.

The API 42 provides programmatic access to one or more functions of the manager 50. For example, the API 42 may provide a programmatic interface to one or more functions of the manager 50 that may be invoked by one of the other programs 30 or some other module. In this manner, the API 42 facilitates the development of third-party software, such as user interfaces, plug-ins, adapters (e.g., for integrating functions of the manager 50 into Web applications), and the like.

In addition, the API 42 may be in at least some embodiments invoked or otherwise accessed via remote entities, such as code executing on one of the network devices 10' and 10", to access various functions of the manager 50. For example, Client and/or Host Data may be obtained from or provided to the manager 50 via the API 42. The API 42 may also be configured to provide management widgets (e.g., code modules) that can be integrated into third-party applications and that are configured to interact with the manager 50 to make at least some of the described functionality available within the context of other applications (e.g., mobile apps).

In an example embodiment, components/modules of the manager 50 are implemented using software programming techniques. For example, the manager 50 may be implemented as a "native" executable running on the CPU 13, along with one or more static or dynamic libraries. In other embodiments, the manager 50 may be implemented as instructions processed by a virtual machine that executes as one of the other programs 30. In general, a range of programming languages may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The various components may be implemented using more monolithic programming techniques, for example, as an executable running on a single CPU computer system, or alternatively decomposed using a variety of structuring techniques, including but not limited to, multiprogramming, multithreading, client-server, or peer-to-peer, running on one or more computer systems each having one or more CPUs. Some embodiments may execute concurrently and asynchronously, and communicate using message passing, remote procedure call, or other distributed computing paradigms. Equivalent synchronous embodiments are also supported. Also, other functions could be implemented and/or performed by each component/module, and in different orders, and by different components/modules, yet still achieve the described functions.

In addition, programming interfaces to the data stored as part of the manager 50, such as in the data store 20, can be available by language-specific APIs; libraries for accessing files, databases, or other data repositories; through representational languages such as XML; or through Web servers, FTP servers, or other types of servers providing access to stored data. The data store 20 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the manager 50 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

While embodiments of the invention have been illustrated and described, as noted above, many changes can be made without departing from the spirit and scope of the invention. Accordingly, the scope of the invention is not limited by the above disclosure.

The invention claimed is:

1. A virtual presence system comprising:
   a first mobile device including a processor that executes a client module;
   a second mobile device including a processor that executes a host module; and
   at least one panoramic camera coupled to the second mobile device;
   wherein the client module is configured to transmit client data to the host module, wherein the client data includes first position data that describes a location and/or orientation selected by a user of the first mobile device; and
   wherein the host module is configured to:
   select image data from the panoramic camera based on the first position data received from the client module; and
   transmit the selected image data to the client module,
   wherein the client module is configured to transfer motion client data from the first mobile device to the panoramic camera coupled to the second mobile device, moving the panoramic camera or image capture orientation of the panoramic camera in correlation with the motion client data.

2. The system of claim 1, further comprising:
   a viewing device in electronic communication with the first mobile device, the viewing device configured to receive at least one of audio and image data communicated by the host module to the client module and present the audio or image data to a user of the viewing device.

3. The system of claim 2, wherein the viewing device is a head-mounted display worn by the user, wherein the head-mounted display is configured to transmit the first position data to the client module executing on the first mobile device.

4. The system of claim 1, wherein the host module is configured to:
   receive the first position data from the client module;
   receive second position data that describes a location and/or orientation of the panoramic camera; and
   select image data from the panoramic camera based on the first position data and the second position data.

5. The system of claim 1, wherein the second mobile device includes multiple display devices, and wherein the host module is configured to present image data received from the client module on the multiple display devices.

6. The system of claim 1 wherein the first mobile device includes a smart phone and the second mobile device includes an image capture and display device.

7. The system of claim 1 wherein the panoramic camera includes a coupling device.

8. The system of claim 1 wherein the first mobile device includes a microphone device and a speaker device, and the second mobile device includes a microphone device, and wherein the first and second mobile devices communicate via an electronic communication protocol that is configured to transfer audio host data received by the microphone device of the second mobile device to the first mobile device, the first mobile device broadcasting the audio host data from the speaker device thereof.

9. The system of claim 8, wherein the second mobile device includes multiple microphones, and wherein the host module is configured to selectively obtain audio from one or more of the multiple microphones based on the received first position data.

10. A method performed by a client device in a virtual presence system, the method comprising:
   in a client module executing on the client device,
      transmitting client data to a host module executing on a remote host device, wherein the client data includes first position data that describes a location and/or orientation selected by a user of the client device;
      causing the remote host module to:
         select image data from a panoramic camera based on the first position data received from the client module; and
         transmit the selected image data to the client module;
      presenting the received image data on a display associated with the client device;
      receiving second position data from the host module, wherein the second position data describes a location and/or orientation of the panoramic camera; and
      presenting along with the received image data an indication that the panoramic camera has moved.

11. The method of claim 10, wherein presenting the received image data includes transmitting the received image data to a head-mounted display worn by the user, and further comprising:
   receiving from the head-mounted display the first position data.

12. The method of claim 10, further comprising:
   transmitting audio and video data to the host module along with the position data; and
   receiving audio and video data from the host module, such that the user of the client device communicates with one or more users of the remote host device.

13. A non-transitory computer-readable medium that includes instructions that are configured, when executed by a computer processor in a host device, to perform a method in a virtual presence system, the method comprising:
   in a host module executing on the host device,
      receiving client data from a client module executing on a remote client device, wherein the client data includes first position data that describes a location and/or orientation selected by a user of the client device;
      obtaining image data from a panoramic camera based on the received first position data; and
      transmitting the obtained image data to the client module for presentation on a display associated with the client device,
   wherein obtaining the image data further comprises:
      receiving second position data that describes a location and/or orientation of the panoramic camera; and
      selecting image data from the panoramic camera based on the first position data and the second position data, wherein the selected image data is obtained from a portion of a field of view of the panoramic camera, the portion determined based on the first position data while compensating for camera movements reflected in the second image data.

14. The computer-readable medium of claim 13, wherein obtaining the image data further comprises:
   selecting image data from a portion of a field of view of the panoramic camera, the portion determined based on the first position data, such that the selected image data reflects the location and/or orientation selected by the user.

15. The computer-readable medium of claim 13, wherein the host device includes multiple display devices, and wherein the method further includes:
   receiving image data from the client module; and
   presenting the image data on the multiple display devices.

16. The computer-readable medium of claim 13, wherein the host device includes an array of multiple microphones, and wherein the method further includes:
   determining the position of a speaking user based on acoustic source localization performed on audio signals received by the multiple microphones; and
   transmitting an indication of the position of the speaking user to the client module.

17. The method of claim 10, wherein the client device is a smart phone, and wherein the host device is a smart phone with an associated panoramic camera.

* * * * *